United States Patent
Bae et al.

(10) Patent No.: US 7,536,176 B2
(45) Date of Patent: May 19, 2009

(54) METHOD AND SYSTEM FOR PROVIDING A BROADCAST/MULTICAST SERVICE IN A WIRELESS COMMUNICATION SYSTEM

(75) Inventors: Beom-Sik Bae, Suwon-si (KR); Dae-Gyun Kim, Seongnam-si (KR); Jung-Soo Jung, Seoul (KR); Jun-Hyuk Song, Anyang-si (KR); Yong Chang, Seongnam-si (KR); Nae-Hyun Lim, Seoul (KR)

(73) Assignee: Samsung Electronics Co., Ltd (KR)

( * ) Notice: Subject to any disclaimer, the term of this patent is extended or adjusted under 35 U.S.C. 154(b) by 827 days.

(21) Appl. No.: 10/822,308

(22) Filed: Apr. 12, 2004

(65) Prior Publication Data

US 2004/0203816 A1    Oct. 14, 2004

(30) Foreign Application Priority Data

Apr. 10, 2003    (KR)    ............... 10-2003-0022558

(51) Int. Cl.
*H04M 3/42* (2006.01)
(52) U.S. Cl. .................... 455/414.1; 455/437
(58) Field of Classification Search ........... 455/436, 455/437, 438, 439, 440, 442, 414.1, 414.3; 370/331
See application file for complete search history.

(56) References Cited

U.S. PATENT DOCUMENTS

| | | | |
|---|---|---|---|
| 6,198,406 B1 * | 3/2001 | Dorenbosch | 340/5.1 |
| 6,473,411 B1 * | 10/2002 | Kumaki et al. | 370/331 |
| 6,574,475 B1 * | 6/2003 | Suzuki | 455/438 |
| 7,203,512 B2 * | 4/2007 | Jeong et al. | 455/522 |
| 7,212,122 B2 * | 5/2007 | Gloekler et al. | 340/572.1 |
| 7,212,824 B2 * | 5/2007 | Terry | 455/450 |
| 2002/0141360 A1 * | 10/2002 | Baba et al. | 370/331 |
| 2003/0054807 A1 * | 3/2003 | Hsu et al. | 455/414 |
| 2003/0100325 A1 * | 5/2003 | Paila et al. | 455/506 |
| 2003/0134622 A1 * | 7/2003 | Hsu et al. | 455/414 |
| 2003/0134640 A1 * | 7/2003 | Kim et al. | 455/438 |
| 2003/0145064 A1 * | 7/2003 | Hsu et al. | 709/219 |
| 2006/0189272 A1 * | 8/2006 | Willenegger et al. | 455/3.01 |

* cited by examiner

*Primary Examiner*—Blane J Jackson
(74) *Attorney, Agent, or Firm*—The Farrell Law Firm, PC (57) ABSTRACT

A broadcast service method and system for use in wireless communication system. The broadcast service method and system for a wireless communication system according to the present invention assigns individual unique BCMCS IDs to a plurality of BCMCS controllers, such that it can recognize a changed BCMCS controller within a cell in which an MS is located, BSPM (Broadcast Service Parameter Message) effectiveness, the BCMCS conversion, etc.

12 Claims, 6 Drawing Sheets

METHOD AND SYSTEM FOR PROVIDING A BROADCAST/MULTICAST SERVICE IN A WIRELESS COMMUNICATION SYSTEM

PRIORITY

This application claims priority to an application entitled "BROADCAST SERVICE METHOD AND SYSTEM FOR USE IN WIRELESS COMMUNICATION SYSTEM", filed in the Korean Intellectual Property Office on Apr. 10, 2003 and assigned Serial No. 2003-22558, the contents of which are hereby incorporated by reference.

BACKGROUND OF THE INVENTION

1. Field of the Invention

The present invention relates generally to a wireless communication system, and more particularly to a method and system for providing a broadcast/multicast service to enable a plurality of mobile stations to receive traffic data having the same contents.

2. Description of the Related Art

Mobile communication technology is constantly advancing to provide better communication services to users. More specifically, a next generation communication environment, e.g., an IMT-2000 (International Mobile Telecommunication-2000), has been upgraded to a new communication environment that provides users with audio and video data, and also with a variety of user-desired information in real time and synthetically. As a result of the increasing development of a variety of mobile communication systems, mobile stations (MSs), e.g., cellular and PCS (Personal Communication Service) phones, perform speech or voice communication between a caller and a called party, and also a text message transmission function between them. Further, the MSs wirelessly provide users with a high-speed packet data service and a broadcast/multicast service (hereinafter referred to as a broadcast service) for broadcasting moving images to the users.

Conventionally, mobile communication systems communicate with one MS using a unicast method to transmit packet data to users. However, a broadcast service transmits the same traffic to a plurality of MSs, and is established by simplex transmission of high-speed forward data without receiving reverse return information from the MSs. This type of broadcast service is similar to a typical television (TV) broadcast service.

In order to enable a CDMA (Code Division Multiple Access) system to provide users with such a broadcast service, many developers have conducted intensive research into an improved broadcast service method for enabling a typical network configuration to control communication between a broadcast server and an MS and easily adding new functions to an air interface and an RAN (Radio Access Network), such that a broadcast service controller is required to control communication between the broadcast server and the MS in addition to controlling the broadcast server.

However, service provider cannot provide users with all kinds of services using only one broadcast service controller because of increased system load. In fact, different broadcast service controllers for every service provider have been used. A plurality of broadcast service controllers may be differently used by such service enterprises, and may also be assigned to areas covered by one service enterprise. However, as a result, the MS cannot recognize other broadcast service controllers using the conventional broadcast service system. Accordingly, a need exists for an improved broadcast service system to recognize a changed broadcast service controller and perform necessary operations associated with the recognized broadcast service controller.

SUMMARY OF THE INVENTION

Therefore, the present invention has been designed in view of the above and other problems, and it is an object of the present invention to provide an apparatus and method for controlling a mobile terminal and a network to classify individual zones of a plurality of broadcast service controllers.

It is another object of the present invention to provide an apparatus and method for adapting broadcast service zone IDs to identify zones in which the same broadcast service is available.

It is yet another object of the present invention to provide a broadcast service apparatus and method for controlling a base station to transmit a broadcast service zone ID to a mobile station (MS) via an overhead message, such that the MS can recognize a broadcast service zone of a corresponding area.

In accordance with one aspect of the present invention, the above and other objects can be accomplished by a method for controlling a Mobile Station (MS) to receive BCMCS (Broadcast/Multicast Service) data in a mobile communication system including at least one BCMCS controllers and the MS for receiving the BCMCS data through a BSs (Base stations), comprising the steps of: receiving, from a new BS, a new BCMCS zone ID that is different from a prestored old BCMCS zone ID, while receiving old BCMCS data from an old BS; requesting new BCMCS data to the new BS; establishing a channel with the new BS; receiving a BCMCS information from the new BS; and receiving the new BCMCS data from the new BS using the BCMCS information.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the drawings, the same or similar elements are denoted by the same reference numerals even though they are depicted in different drawings. Additionally, in the following description, a detailed description of known functions and configurations incorporated herein will be omitted when it may make the subject matter of the present invention rather unclear.

The present invention enables a CDMA communication system to support a broadcast service over an F-PDCH (Forward Packet Data Channel) used for high-speed data transmission. More specifically, the present invention enables the CDMA communication system to support a broadcast/multicast service and a dedicated service at the same time. In the present invention, the broadcast service is a packet data service based on a unicast service, and the broadcast/multicast service (hereinafter referred to as a broadcast service) is a broadcast service capable of transmitting the same traffic data to a plurality of MSs.

Figure 1:
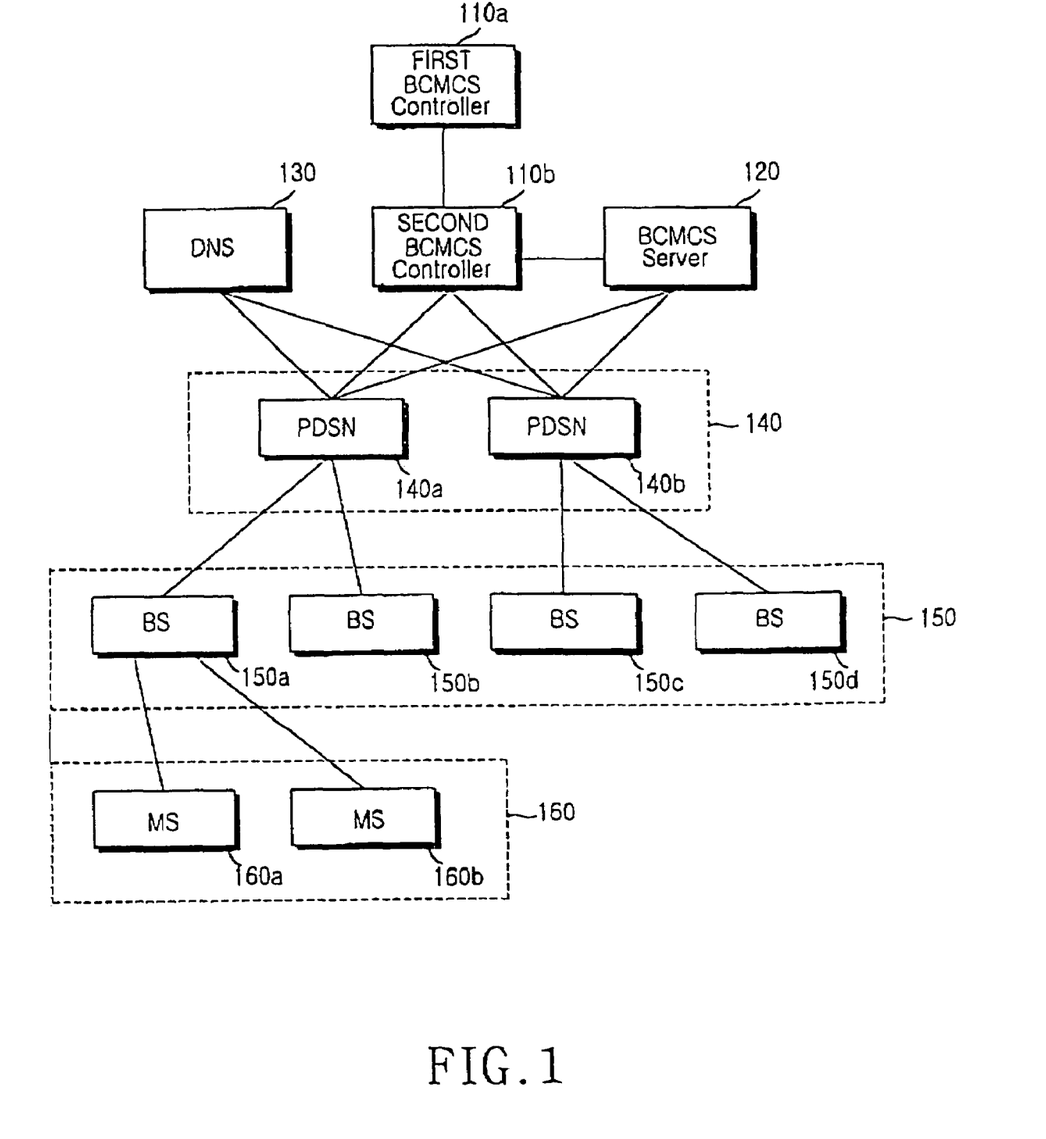
FIG. 1 is a block diagram illustrating a broadcast service system in accordance with the present invention.

FIG. 1 is a block diagram illustrating a broadcast service system in accordance with the present invention. Referring to FIG. 1, a BCMCS (Broadcast/Multicast Service Server or Contents Server) server 120 generates broadcast data including video and sound data used for a broadcast service in the form of a compressed IP (Internet Protocol) packet. The broadcast data in the compressed IP is transmitted to a plurality of base stations (BSs) 150a, 150b, 150c, and 150d over PDSNs (Packet Data Service Nodes) 140a and 140b included in a packet communication network such as the Internet.

The BSs 150a, 150b, 150c, and 150d each include a BTS (Base Transceiver Subsystem), a BSC (Base Station Controller), and a PCF (Packet Control Function) module. A second BCMCS controller 110b, which is connected to a first BCMCS controller 110a, controls communication between the BCMCS server 120 and the MSs 160a and 160b, and performs some functions between an air interface and a RAN (Radio Access Network) to implement a desired broadcast service. Although the present invention discloses only one BCMCS server 120 for the convenience of description, it should be noted that the present invention can also use a plurality of BCMCS servers.

The first BCMCS controller 110a is connected to the second BCMCS controller 110b and a plurality of BCMCS servers (not shown), which are assigned for every enterprise and zone. The plurality of BCMCS servers and the first BCMCS controller 110a configure a same network as in the second BCMCS controller 110b.

IP multicast or the IP unicast is used to transmit broadcast data generated by the BCMCS server 120 to the of PDSNs 140a and 140b. A conventional CDMA2000 access network scheme is used to transmit the broadcast data from the PDSNs 140a and 140b to the BSs 150, 150b, 150c, and 150d. When using the IP multicast, the PDSNs 140a and 140b each create a multicast group for receiving the IP multicast data from the BCMCS server 120. Membership information associated with the multicast group is maintained by a multicast router (MR) (not shown), which is connected to individual PSDNs 140a and 140b. The PDSNs 140a and 140b are connected to a DNS (Domain Name System) (not shown) for managing IP addresses.

IP data including video and sound data that is generated from the BCMCS server 120 is broadcast to the PDSNs 140a and 140b, which form a multicast group, or is unicast individually to the PDSNs 140a and 140b. The PDSNs 140a and 140b transmit the IP data to the BSs 150a, 150b, 150c, and 150d using CDMA2000 access network technologies. Thereafter, the BSs 150a, 150b, 150c, and 150d convert the IP data into RF (Radio Frequency) data, and transmit the RF data from a corresponding service zone to another service zone.

The BSs 150a, 150b, 150c, and 150d require information associated with broadcast service zone IDs for identifying the BCMCS controller zone in which either of the MSs 160a and 160b is positioned. The requisite information is shown below in Table 1.

TABLE 1

| Field | Length (Bits) |
|---|---|
| BCMCS_SUPPORT | 1 |
| BCMCS_ZONE_ID | 0 or 8 |

With reference to Table 1, the BCMCS_SUPPORT field indicates whether a broadcast/multicast service of 1 bit is supported. If it a corresponding cell can support the broadcast/multicast service, the BCMCS_SUPPORT field is set to "1". However, if a corresponding cell cannot support the broadcast/multicast service, the BCMCS_SUPPORT field is set to "0". The BCMCS_ZONE_ID field identifies a broadcast service zone ID, and is comprised of 8 bits when the BCMCS_SUPPORT field is set to "1". Additionally, the BCMCS_ZONE_ID indicates zone ID information of a BCMCS controller controlling a current broadcast service.

The BCMCS_SUPPORT field and the BCMCS_ZONE_ID field can be included in a BSPM (Broadcast Service Parameter Message) in the broadcast system such that they can be defined in the lowermost fields along with broadcast service information. The BCMCS_SUPPORT field and the BCMCS_ZONE_ID field may also be further included in an ESPM (Extended System Parameter Message), an ANSI (American National Standards Institute)-41 system parameter message, a GHDM (General Handoff Direction Message), a UHDM (Universal Handoff Direction Message), an ITSPM (In-Traffic System Parameter Message), etc. In this case, provided that the MS is in an idle state, the ESPM or ANSI-41 system parameter message is transmitted to a common channel for transmitting an overhead message in the same manner as in an F-CH (Forward Paging Channel) or F-BCCH (Forward Broadcast Control Channel). The GHDM, UHDM, or ITSPM is transmitted to a corresponding traffic channel on the condition that the MS is connected to a traffic channel.

A method for controlling an MS or network to classify a plurality of broadcast service areas, i.e., zones, of a BCMCS controller when the MS enters a dormant handoff mode in the broadcast system having the aforementioned configurations will hereinafter be described with reference to FIG. 2.

Figure 2:
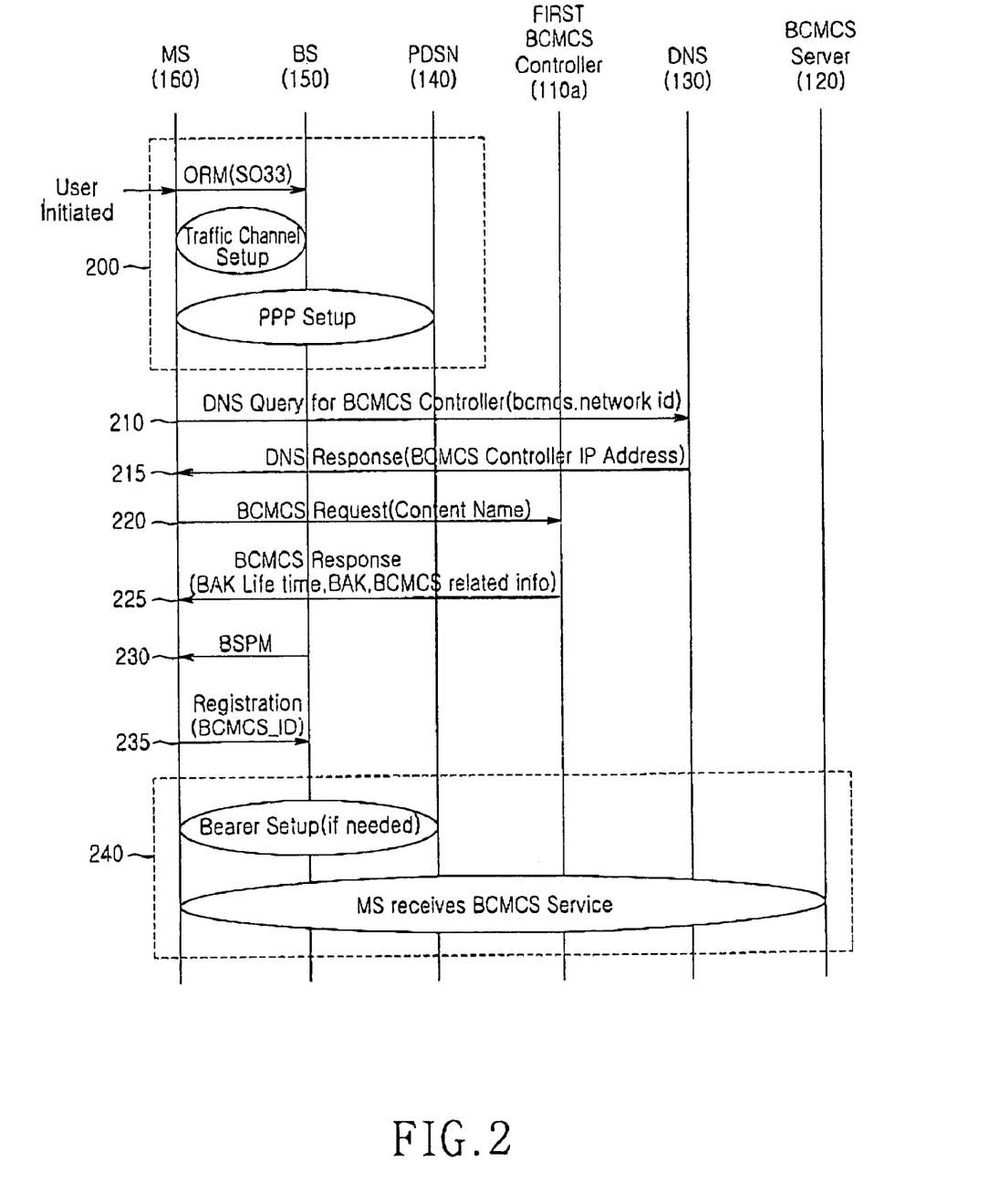
FIG. 2 is a flow chart illustrating a call control procedure for controlling a mobile station (MS) to receive broadcast service data within a previous broadcast service controller zone in accordance with a first preferred embodiment of the present invention.

FIG. 2 is a flow chart illustrating a call control procedure for controlling a mobile station (MS) to receive broadcast service data within a previous broadcast service controller zone in accordance with a first preferred embodiment of the present invention.

Referring to FIG. 2, an MS 160 transmits an ORM (Origination Message) for indicating a handoff mode to a BS 150, such that the MS 160 can carry out a data service in association with the BS 150 at step 200. The MS 160 establishes a traffic channel with the BS 150, connects to a PDSN 140, and performs a broadcast service PPP (Point to Point Protocol) setup operation, such that a broadcast service path is established between the MS 160 and the PDSN 140.

Upon receiving information about a DNS server 130 from the above PPP setup process, the MS 160 requests information associated with the first BCMCS controller 110a from the DNS server 130 at step 210. The DNS server 130 recognizes an IP address associated with the BCMCS controller 110a, and transmits the recognized IP address to the MS 160 at step 215.

The MS 160 detects the first BCMCS controller 110a corresponding to the received IP address, and requests information, i.e., BCMCS-associated information, needed to receive user-desired broadcast contents from the detected first BCMCS controller 110a at step 220. The first BCMCS controller 110a authenticates the MS, i.e., determines whether a user of the MS is authorized to receive a broadcast service, and transmits information associated with the broadcast service to the MS 160 at step 225. In this case, the BCMCS-associated information includes corresponding broadcast service-associated information, for example, a BAK (Broadcast Access Key) for receiving broadcast contents, a BAK effective time, multiple IP address and port information, etc. The first BCMCS controller 110a controls the BCMCS server 120, and commands the BCMCS server 120 to provide the MS 160 with the broadcast service. The aforementioned procedure is not illustrated in FIG. 2, and for the convenience of description, the present invention does not disclose the command-associated procedure and other procedures during which the BCMCS server 120 transmits broadcast service contents to the PDSN 140.

Upon receiving the broadcast service-associated information from the first BCMCS controller 110a, the MS 160 receives a broadcast service parameter message (BSPM) from the BS 150 over an overhead channel at step 230. The BSPM includes information, e.g., BCMCS category, and corresponding BCMCS contents information received from a broadcasting station, associated with other information received from the BCMCS server 120, and traffic channel information (hereinafter referred to as broadcast provision information) for receiving the broadcast service contents.

The MS 160 transmits a registration message including a desired broadcast service ID to the BS 150 according to a dynamic broadcast service method at step 235. Provided that the MS 160 first receives corresponding broadcast contents and transmits a registration message, the MS 160 performs a bearer setup procedure to determine a predetermined path associated with the PDSN 140, and receives broadcast service contents that have been transmitted to the PDSN 140 according to the command of the first BCMCS controller 110a at step 240. If a bearer for a corresponding broadcast service has already been established, the MS 160 directly receives broadcast service contents without performing the bearer setup procedure.

A call control procedure performed when the MS establishes a handoff mode with a second BCMCS controller zone, which is different from the first BCMCS controller zone, while receiving the broadcast service contents will hereinafter be described with reference to FIG. 3.

Figure 3:
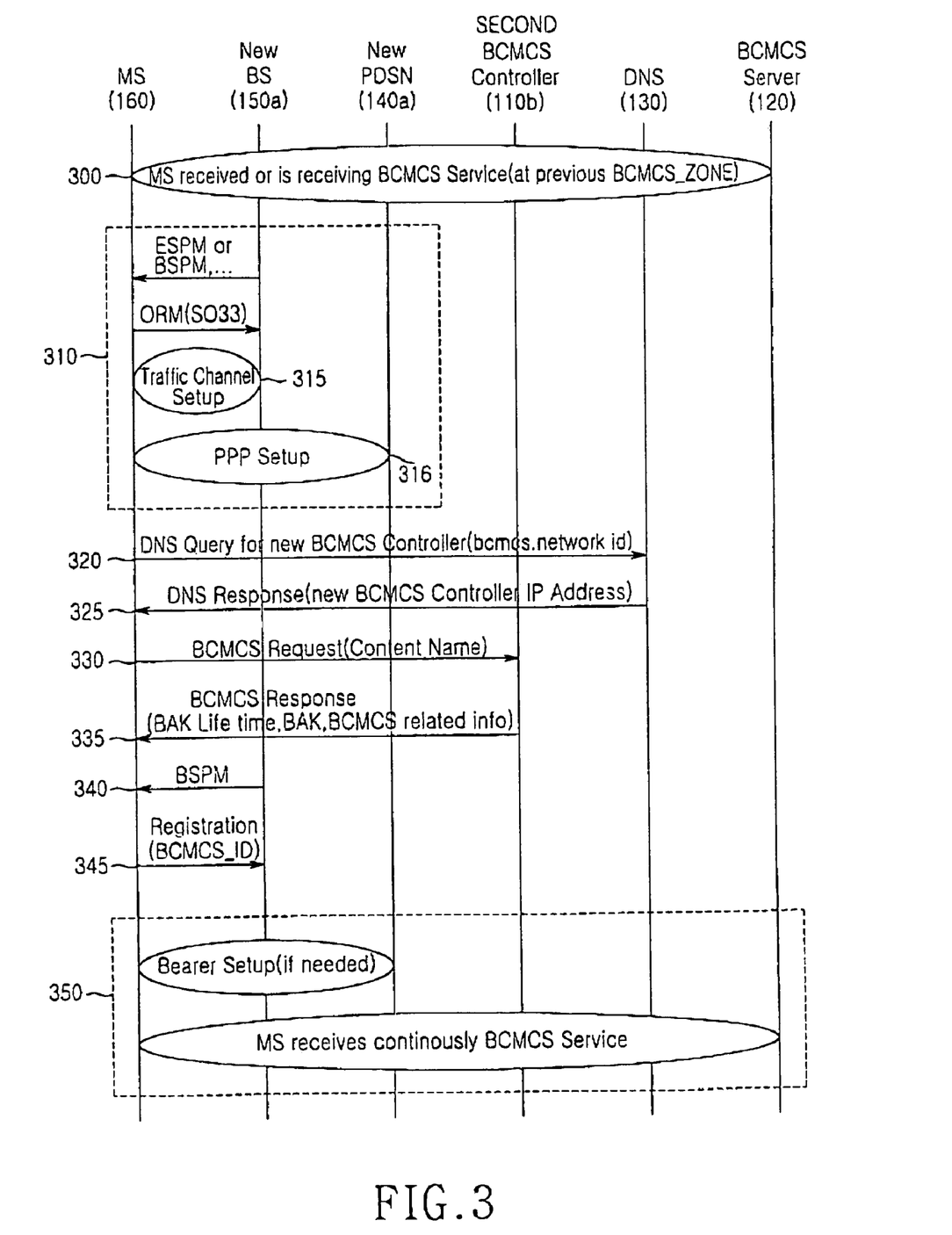
FIG. 3 is a flow chart illustrating a call control procedure for controlling a mobile station (MS), which has moved to another broadcast service zone, to receive broadcast service data in the broadcast service controller zone in accordance with a second preferred embodiment of the present invention.

FIG. 3 is a flow chart illustrating a call control procedure performed when an MS enters a handoff mode in accordance with a second preferred embodiment of the present invention. It should be noted that for the convenience of description, the preferred embodiments illustrated in FIGS. 3 to 6 will be described using only one network selected from among a plurality of networks connected to the second BCMCS controller 110b illustrated in FIG. 1.

Referring to FIG. 3, at step 300, the MS 160 is positioned in the zone of the first BCMCS controller (not shown) according to the procedure illustrated in FIG. 2. Upon receiving a control signal from the first BCMCS controller, the MS 160 receives broadcast service data from the BCMCS server 120 at step 300. If the MS 160 moves to a boundary zone of the first BCMCS controller, the MS 160 receives all the signals from the first BCMCS controller and the second BCMCS controller 110b. Therefore, the MS 160 receives an ID of the second BCMCS controller 110b via ESPM or BSPM at step 310. The MS 160 transmits an ORM used for the dormant handoff mode to a new BS 150a in the same manner as described in step 200 of FIG. 2, performs a traffic channel setup procedure at step 315, and performs a PPP setup procedure at step 316.

The MS 160 requests information of the second BCMCS controller 110b from the DNS 130 at step 320. The DNS 130 recognizes an IP address of the second BCMCS controller 110b, and transmits the recognized IP address to the MS 160 at step 325. The MS 160 requests content information associated with current received broadcast service from the second BCMCS controller 110b via the received IP address at step 330. Thereafter, at step 335, the MS 160 receives a variety of response messages associated with the information request message from the second BCMCS controller 110b, for example, a BAK effective time, a BAK, and BCMCS-associated information.

The MS 160 receives BCMCS-associated information and traffic channel information, upon receiving a BSPM from the new BS 150a, at step 340. The MS 160 transmits a registration message including the BCMCS ID information to the new BS 150a at step 345. At step 350, the MS 160 receives BCMCS data from a PDSN 140a connected to the BCMCS server 120 in the same manner as in step 240 illustrated in FIG. 2.

In accordance with the above-described second preferred embodiment, when the MS detects a changed BCMCS, the MS includes an old BCMCS zone ID in either a registration message of the new BS or a dormant handoff ORM with the new BS registration message and the dormant handoff ORM, such that the MS 160 can inform a user of the BCMCS zone conversion. In accordance with a third preferred embodiment of the present invention, a call control procedure performed when BCMCS content information received by the MS in the new BCMCS zone is the same as the BCMCS content information received in the old BCMCS zone will hereinafter be described with reference to FIG. 4.

Figure 4:
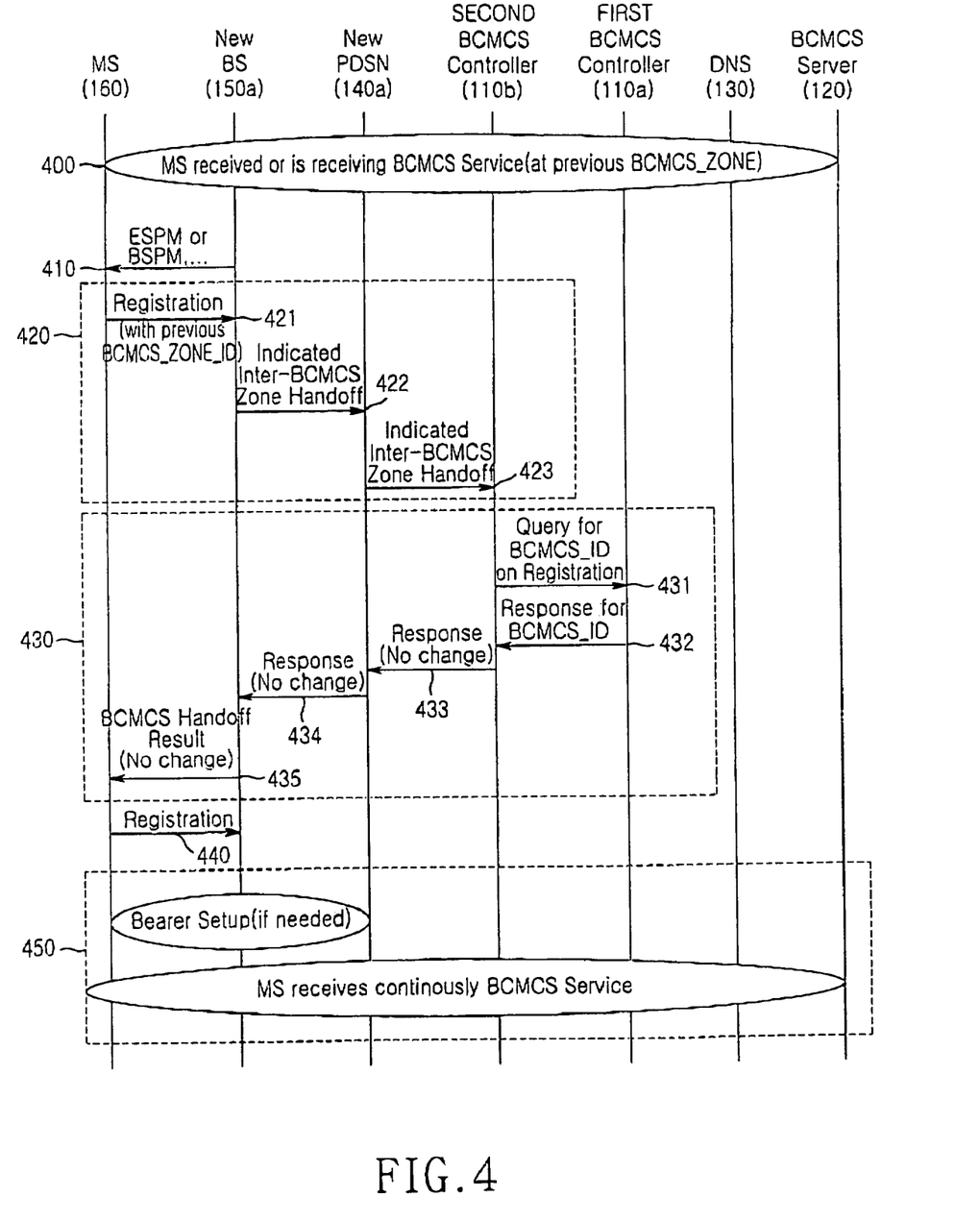
FIG. 4 is a flow chart illustrating a call control procedure in which a mobile station (MS) uses the same broadcast service contents as those in a previous broadcast service zone in accordance with a third preferred embodiment of the present invention.

FIG. 4 is a flow chart illustrating a call control procedure in which a mobile station (MS) receives the same BCMCS content information in a new BCMCS zone as was received in the previous BCMCS zone in accordance with a third preferred embodiment of the present invention. Referring to FIG. 4, at step 400, the MS 160 has received BCMCS data or currently receives the BCMCS data. The MS 160 receives a changed BCMCS zone ID "BCMCS_ZONE_ID" through the BSPM at step 410, such that it can recognize that the BCMCS zone is changed to another zone. The MS 160 informs the new BS 150a of the BCMCS zone conversion, and indicates that a current mode is handed off to the second BCMCS controller 110b over the new PDSN 140a at step 420. More specifically, the MS 160 transmits a registration message including a previous BCMCS zone ID "BCMCS_ZONE_ID" to the new BS 150a to indicate the BCMCS zone conversion at step 421. The new BS 150a transmits a BCMCS zone handoff command message "Inter-BCMCS Zone Handoff" to the new PDSN 140a at step 422. The new PDSN 140a transmits the received Inter-BCMCS Zone Handoff message to the second BCMCS controller 110b functioning as the new BCMCS controller at step 423. As a result, the new PDSN 140a and the second BCMCS controller 110b can recognize a handoff state of the MS 160.

Upon receiving specific information BCMCS_ID, the MS 160 receives BCMCS handoff result data including prescribed result data indicating whether BCMCS-associated information is converted from the network at step 430. Detailed operations of the step 430 will hereinafter be described with reference to FIG. 4.

The second BCMCS controller 110*b* requests, from the first BCMCS controller 110*a* acting as a previous BCMCS controller, the conversion of corresponding BCMCS information using a BCMCS ID (BCMCS_ID) to be received in the MS 160 at step 431. The first BCMCS controller 110*a* provides the second BCMCS controller 110*b* with a response message to the request at step 432. Upon receipt of the specific information BCMCS_ID, the first BCMCS controller 110*a* determines whether the BCMCS-associated information to be used for corresponding BCMCS contents is the same as the other BCMCS-associated information received from the second BCMCS controller 110*b*. Alternatively, the second BCMCS controller 110*b* may determine whether BCMCS-associated information received from the first BCMCS controller 110*a* is the same as current BCMCS-associated information.

Upon receiving a message indicating that the same BCMCS-associated information being from the first BCMCS controller 110*a*, the second BCMCS controller 110*b* transmits a response message indicating no change in BCMCS contents to the MS 160 to the new PDSN 140*a* at step 433. The new PDSN 140*a* transmits the received response message to the new BS 150*a* at step 434. The new BS 150*a* transmits a BCMCS handoff result message indicating that there is no change in the BCMCS contents to the MS 160 at step 435.

Thereafter, the MS 160 recognizes that there is no change in the BCMCS contents, and transmits, at step 440, a registration message to the new BS 150*a* so as to receive BCMCS data using its own current information. The MS 160 performs the same operation as described in step 350 of FIG. 3, and continues to receive the BCMCS data at step 450.

Provided that individual MSs receive the BCMCS data while maintaining a PPP connection state at step 410, the MS 160 may transmit the ORM, which indicates a handoff state. The ORM format is described below in Table 2. The remaining fields other than the fields shown in Table 2 are well known to those skilled in the art. Therefore, their detailed description will be omitted herein for the convenience of description.

TABLE 2

| Field | Length (bits) |
|---|---|
| BCMCS_ZONE_CHANGE_INDICATOR | 1 |
| PREV_BCMCS_ZONE_ID | 0 or 8 |

Referring to Table 2, the BCMCS_ZONE_CHANGE_INDICATOR field indicates the conversion of a BCMCS zone ID comprising 1 bit to another ID. If it is determined that a previous reception BCMCS zone ID denoted by PREV_BCMCS_ZONE_ID is different from a current reception BCMCS zone ID, the MS assigns a predetermined value of 1 to the BCMCS_ZONE_CHANGE_INDICATOR field. However, if it is determined that the previous reception BCMCS zone ID denoted by PREV_BCMCS_ZONE_ID is equal to the current reception BCMCS zone ID, the MS assigns a predetermined value of 0 to the BCMCS_ZONE_CHANGE_INDICATOR field. The PREV_BCMCS_ZONE_ID field indicates previous BCMCS zone ID information comprising 0 or 8 bits. The PREV_BCMCS_ZONE_ID field is used when the BCMCS_ZONE_CHANGE_INDICATOR field is assigned the value of 1, and is assigned a previous BCMCS zone ID.

When only the BCMCS ID is changed to another ID in association with the same BCMCS contents, the MS includes a small amount of information to be updated and its own information determined to be mostly effective information resulting in a time delay and resource consumption when the MS is connected to the BCMCS controller. Therefore, the BCMCS controller directly transmits BCMCS_ID information to the MS, such that there is no need for the MS to access the BCMCS controller to acquire BCMCS information. In accordance with a fourth preferred embodiment of the present invention, a call control procedure that is performed when only a BCMCS ID associated with corresponding BCMCS contents is changed to another ID will hereinafter be described with reference to FIG. 5.

Figure 5:
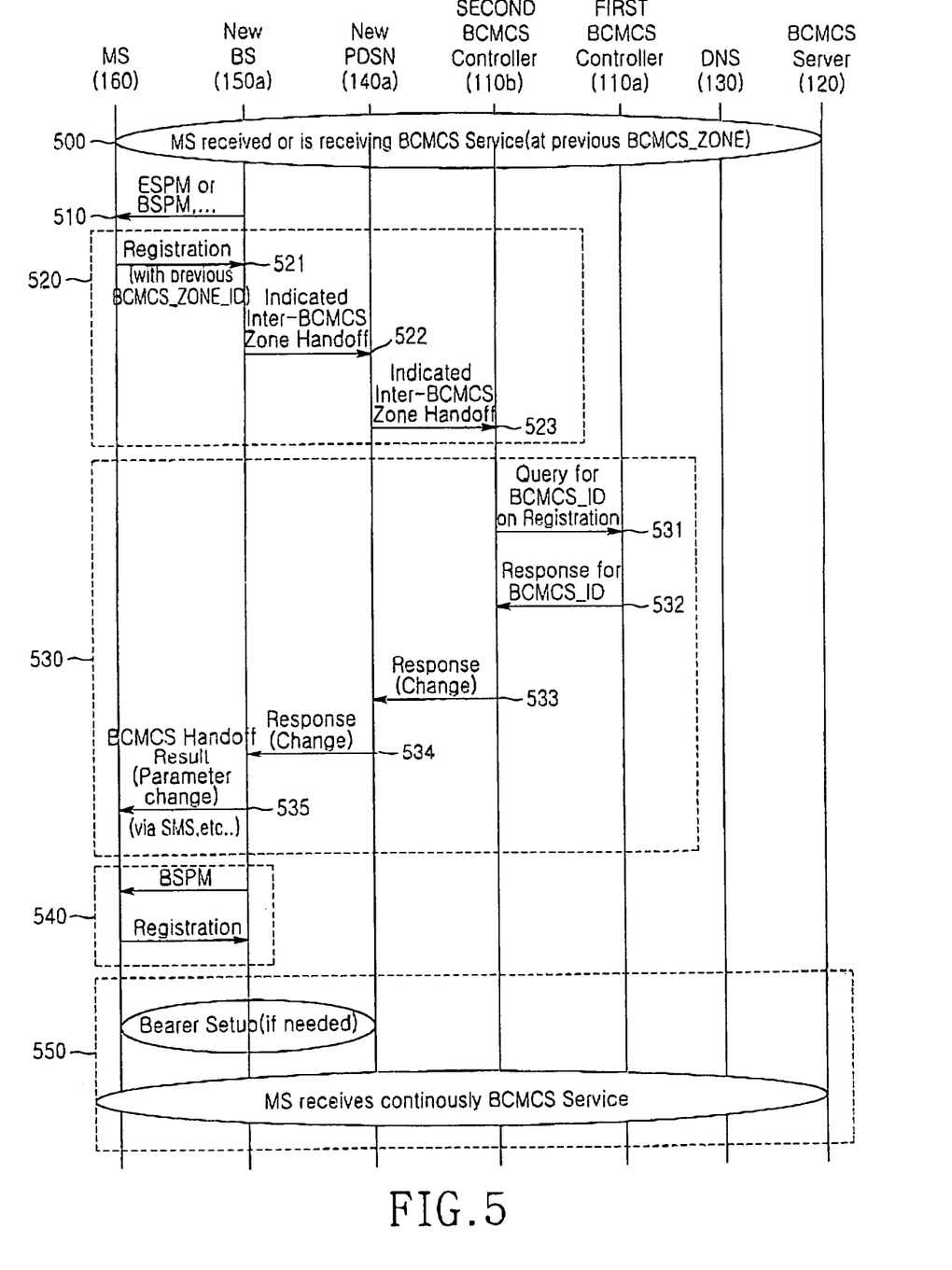
FIG. 5 is a flow chart illustrating a call control procedure in which a mobile station (MS) receives corresponding broadcast service contents using only information received from a new base station in accordance with a fourth preferred embodiment of the present invention.

FIG. 5 is a flow chart illustrating a call control procedure in which a mobile station (MS) receives corresponding BCMCS contents using only information received from a new base station in accordance with a fourth preferred embodiment of the present invention. In FIG. 5, steps 500-520 in the fourth preferred embodiment are substantially equal to steps 400-420 as illustrated in FIG. 4. Therefore, a detailed description of steps 500-520 will be omitted herein for the convenience of description.

The MS 160 receives the BCMCS Handoff Result message including result information that identifies the conversion of BCMCS-associated information such as BCMCS_ID from the network at step 530.

The second BCMCS controller 110*b*, which is a new BCMCS controller, requests, from the first BCMCS controller 110*a* acting as an old BCMCS controller, the conversion of corresponding BCMCS information using BCMCS ID information (BCMCS_ID) to be received in the MS 160 at step 531. Therefore, the first BCMCS controller 110*a* transmits a response message to the request to the second BCMCS controller 110*b* at step 532. The first BCMCS controller 110*a* determines whether BCMCS-associated information, e.g., BCMCS_ID, to be used for corresponding BCMCS contents is to the same as BCMCS-associated information received from the second BCMCS controller 110*b*. This determination step is substantially equal to steps 431-432 illustrated in FIG. 4.

Upon receiving the result information identifying different BCMCS-associated information from the first BCMCS controller 110*a*, the second BCMCS controller 110*b* transmits a response message indicating the BCMCS contents conversion of the MS 160 to the new PDSN 140*a* at step 533. Thereafter, the new PDSN 140*a* transmits the received response message to the new BS 150*a* at step 534. The new BS 150*a* transmits the BCMCS handoff result message to the MS 160 at step 535. Herein, the message received in the MS 160 may be configured in the form of a signal message, or may also be configured in the form of an SMS (Short Message Service) message. Additionally, the message received in the MS 160 may be transmitted to a target place using the SMS service. A detailed configuration of the message is shown below in Table 3.

TABLE 3

| Field | Length (bits) |
|---|---|
| CHANGE_TYPE | 2 |
| Type-specific | Variable |

Referring to Table 3, the CHANGE_TYPE field indicates which parameter, each having 2 bits, is changed to another parameter. For example, if the CHANGE_TYPE field is assigned "00" or "10", it indicates a reservation function. If the CHANGE_TYPE field is assigned "01", it indicates a changed BCMCS ID). If the CHANGE_TYPE field is assigned "11", it indicates that there is a need for a parameter managed by the BCMCS controller to be changed to another parameter.

The Type-specific field indicates specific type information determined by the CHANGE_TYPE field value comprising variable bits. More specifically, if the CHANGE_TYPE field value is "01", the Type-specific field has the length of 32 bits, and includes a new BCMCS ID associated with the reception contents of the MS. The Type-specific field is not used when the CHANGE_TYPE field is assigned other values other than "00", "10", "01", and "11".

Referring back to FIG. 5, upon receiving the BCMCS handoff result message identifying the parameter conversion from the network, the MS 160 determines that there is no need to access the second BCMCS controller 110b, receives the broadcast provision information via the BSPM from the new BS 150a, and transmits a registration message to the new BS 150a at step 540. At step 550, the MS 160 performs the same procedure as described in step 450 of FIG. 4, such that the MS 160 can continue to receive the BCMCS data.

If it is determined that the old BCMCS contents cannot be broadcast in the new BCMCS controller's zone, namely, if it is determined that the old BCMCS contents are quite different from those of the new BCMCS controller, the MS must access the new BCMCS controller and then receive the changed BCMCS-associated information from the BCMCS controller. For example, when there is a large amount of data such as a security-associated key to be transmitted, or there is a need to update specific information requesting security maintenance, the MS must be connected to the BCMCS controller.

Figure 6:
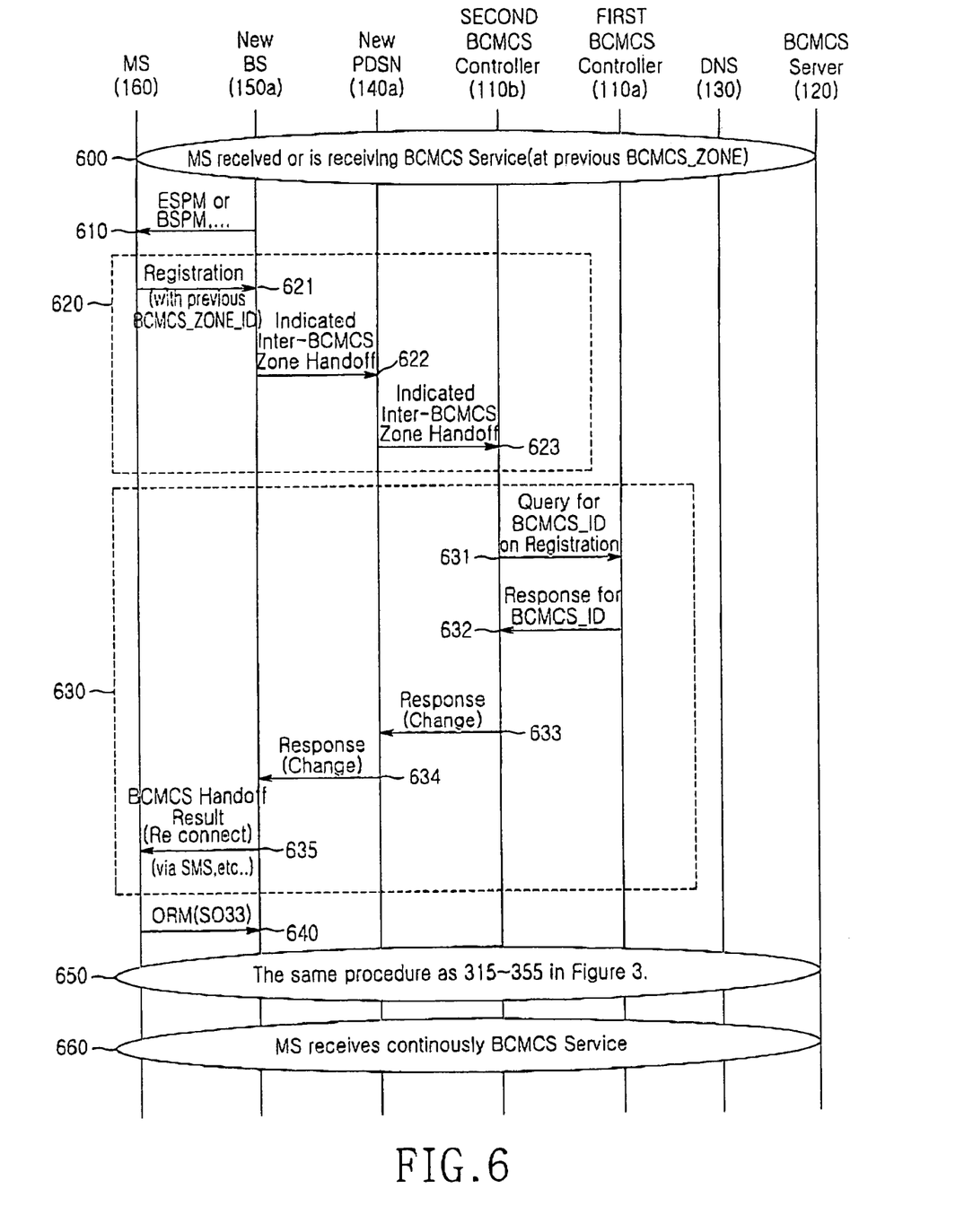
FIG. 6 is a flow chart illustrating a call control procedure in which a mobile station (MS) accesses a new broadcast service controller in accordance with a fifth preferred embodiment of the present invention.

FIG. 6 is a flow chart illustrating a call control procedure in which a mobile station (MS) accesses a new BCMCS controller in accordance with a fifth preferred embodiment of the present invention. Referring to FIG. 6, steps 600-630 are substantially to the same as steps 500-530 of FIG. 5. Therefore, a detailed description of steps 600-630 will be omitted herein for the convenience of description.

The MS 160 transmits a handoff ORM to the new BS 150a at step 640. The MS 160 performs procedures ranging from the traffic channel setup process to the bearer setup process at step 650, i.e., as the same procedure as described above in steps 315 to 355 of FIG. 3. Thereafter, the MS 160 receives corresponding BCMCS data upon receiving a control signal from the second BCMCS controller 110b at step 660.

As is apparent from the description above, a broadcast service method for a wireless communication system according to the present invention assigns individual unique BCMCS IDs to a plurality of BCMCS controllers, such that it can recognize a changed BCMCS controller within a cell in which an MS is located, BSPM (Broadcast Service Parameter Message) effectiveness, the BCMCS conversion, etc.

Although preferred embodiments of the present invention have been disclosed for illustrative purposes, those skilled in the art will appreciate that various modifications, additions, and substitutions are possible, without departing from the scope and spirit of the present invention as disclosed in the accompanying claims.

What is claimed is:

1. A method for controlling a Mobile Station (MS) to receive BCMCS (Broadcast/Multicast Service) data in a mobile communication system including at least one BCMCS controllers and the MS for receiving the BCMCS data through a BSs (Base stations), comprising the steps of:
    receiving, from a new BS, a new BCMCS zone ID that is different from a prestored old BCMCS zone ID, while receiving the BCMCS data from an old BS;
    requesting the BCMCS data to the new BS;
    establishing a channel with the new BS;
    receiving a BCMCS information from the new BS;
    transmitting a registration message to the new BS to provide the BCMCS data by using a new BCMCS controller; and
    receiving the BCMCS data from the new BS using the BCMCS information;
    wherein the BCMCS zone ID is received with an indicator indicating whether the BCMCS is supported in the new BS.

2. The method as set forth in claim 1, further comprising the step of establishing a predetermined path with the PDSN connected to a new BCMCS controller.

3. A method for controlling a Mobile Station (MS) to receive BCMCS (Broadcast/Multicast Service) data in a mobile communication system including at least one BCMCS controllers and the MS for receiving the BCMCS data through a BSs (Base stations), comprising the steps of:
    receiving, from a new BS, a new BCMCS zone ID that is different from a prestored old BCMCS zone ID, while receiving old BCMCS data from a old BS;
    registering a BCMCS service in the new BS using the prestored old BCMCS zone ID;
    indicating that the MS is handed off to a new BCMCS controller from among the at least two BCMCS controllers via the new BS;
    determining, by the new BCMCS controller, whether new BCMCS-associated information is equal to old BCMCS-associated information;
    receiving the determination result from the new BCMCS controller; and
    if the new BCMCS-associated information is equal to the old BCMCS-associated information, receiving the BCMCS data in the MS from the new BS.

4. The method as set forth in claim 3, further comprising the step of transmitting a registration message to the new BS for being provided the BCMCS data by using the new BCMCS controller.

5. The method as set forth in claim 3, further comprising the step of establishing a predetermined path with a PDSN connected to the new BCMCS controller.

6. A method for controlling a Mobile Station (MS) to receive BCMCS (Broadcast/Multicast Service) data in a mobile communication system including at least one BCMCS controllers and the MS for receiving the BCMCS data through a BSs (Base stations), comprising the steps of:
    receiving, from a new BS, a new BCMCS zone ID that is different from a prestored old BCMCS zone ID, while receiving old BCMCS data from a old BS;
    registering the old BCMCS service in the new BS using the prestored old BCMCS zone ID;

indicating that the MS is handed off to a new BCMCS controller from among the at least two BCMCS controllers via the new BS;

determining, by the new BCMCS controller, whether new BCMCS-associated information is equal to old BCMCS-associated information;

receiving the determination result from the new BCMCS controller; and if the new BCMCS-associated information is equal to the old BCMCS-associated information, receiving the new BCMCS-associated information from the new BCMCS controller; and receiving the BCMCS data from the new BS using the new BCMCS-associated information.

7. The method as set forth in claim 6, further comprising the steps of:

if there is a need for the MS to be re-connected to the new BCMCS controller, requesting BCMCS data from the new BS, and establishing a predetermined channel with the new BS;

accessing a PDSN connected to the new BS using a protocol setup operation;

requesting new BCMCS information from the new BCMCS controller; and receiving the new BCMCS information.

8. The method as set forth in claim 7, further comprising the step of transmitting a registration message to the new BS for being provided the BCMCS data by using the new BCMCS controller.

9. The method as set forth in claim 7, further comprising the step of establishing a predetermined path with the PDSN connected to the new BCMCS controller.

10. An apparatus for providing BCMCS (Broadcast/Multicast Service) service in a mobile communication system, the apparatus comprising:

a MS for requesting BCMCS data from a new BS using a prestored BCMCS zone ID when a BCMCS zone ID, which is different from the prestored BCMCS zone ID, is received from the new BS while receiving the BCMCS data, and requesting BCMCS-associated information used for the BCMCS data;

at least one base station (BS), including the new bases station, for wirelessly communicating with the MS and transmitting the BCMCS zone IDs and broadcast provision information;

at least two BCMCS controllers that are connected to at least one PDSN (Packet Data Service Node), which transmits packet data service data to the at least one BS, for transmitting BCMCS-associated information for the BCMCS data requested by the MS to the MS over the connected PDSN, and containing the BCMCS zone IDs; and a BCMCS server for providing the MS with the BCMCS data using the BCMCS-associated information and the broadcast provision information.

11. The apparatus as set forth in claim 10, wherein the at least two BCMCS controllers compare current BCMCS-associated information with previous BCMCS-associated information, and transmit the comparison result to the MS.

12. The apparatus as set forth in claim 11, wherein the MS uses the BCMCS-associated information of current BCMCS data when the current BCMCS-associated information is equal to the previous BCMCS-associated information, and requests new BCMCS-associated information when the current BCMCS-associated information is different from the previous BCMCS-associated information, such that it receives the new BCMCS-associated information from a BCMCS controller of a changed zone.

* * * * *